Dec. 27, 1938.  D. B. DICKERSON  2,141,266
BRAKE LEVER
Filed Dec. 11, 1937  2 Sheets-Sheet 2
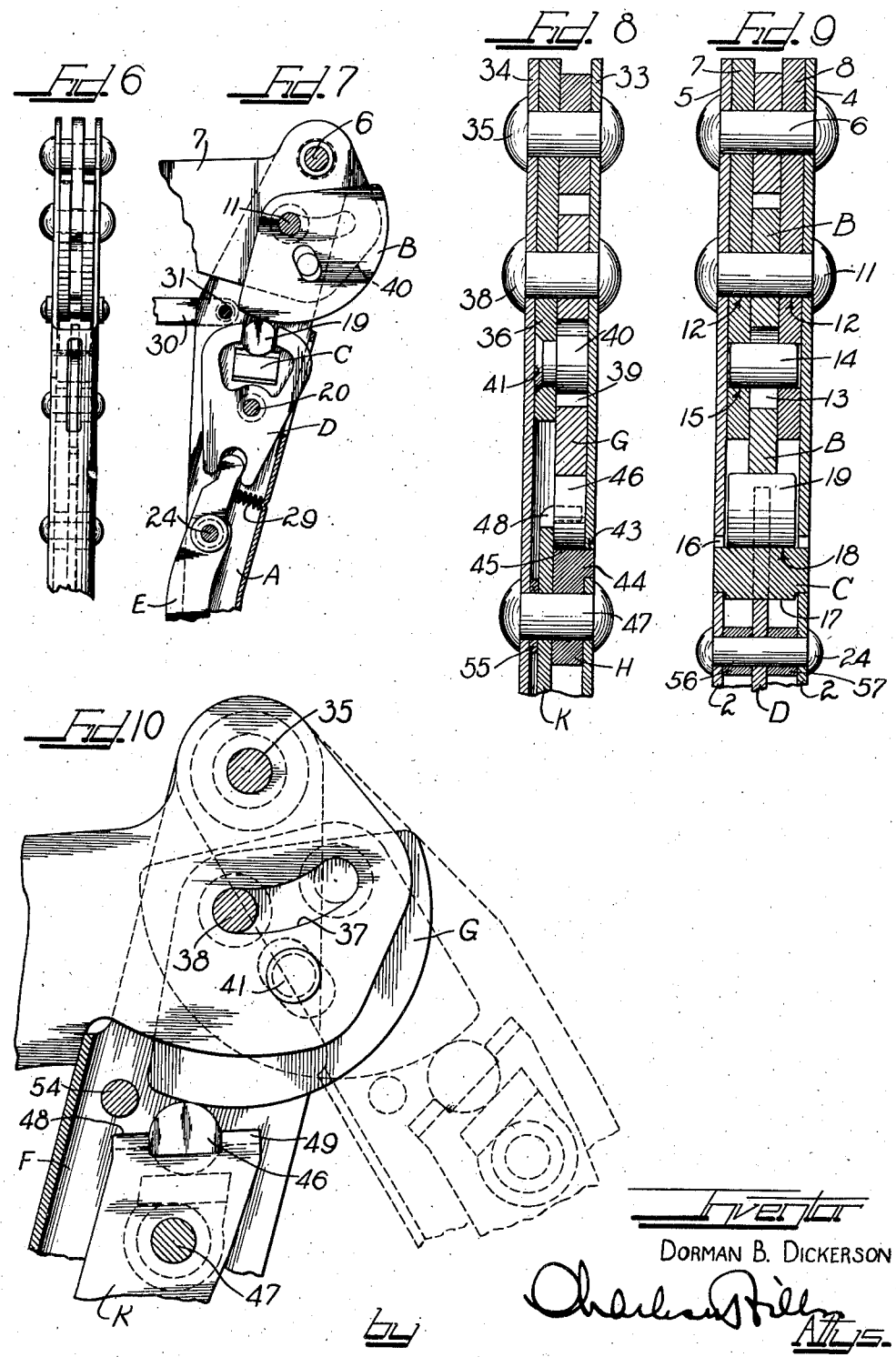
Inventor
DORMAN B. DICKERSON Patented Dec. 27, 1938

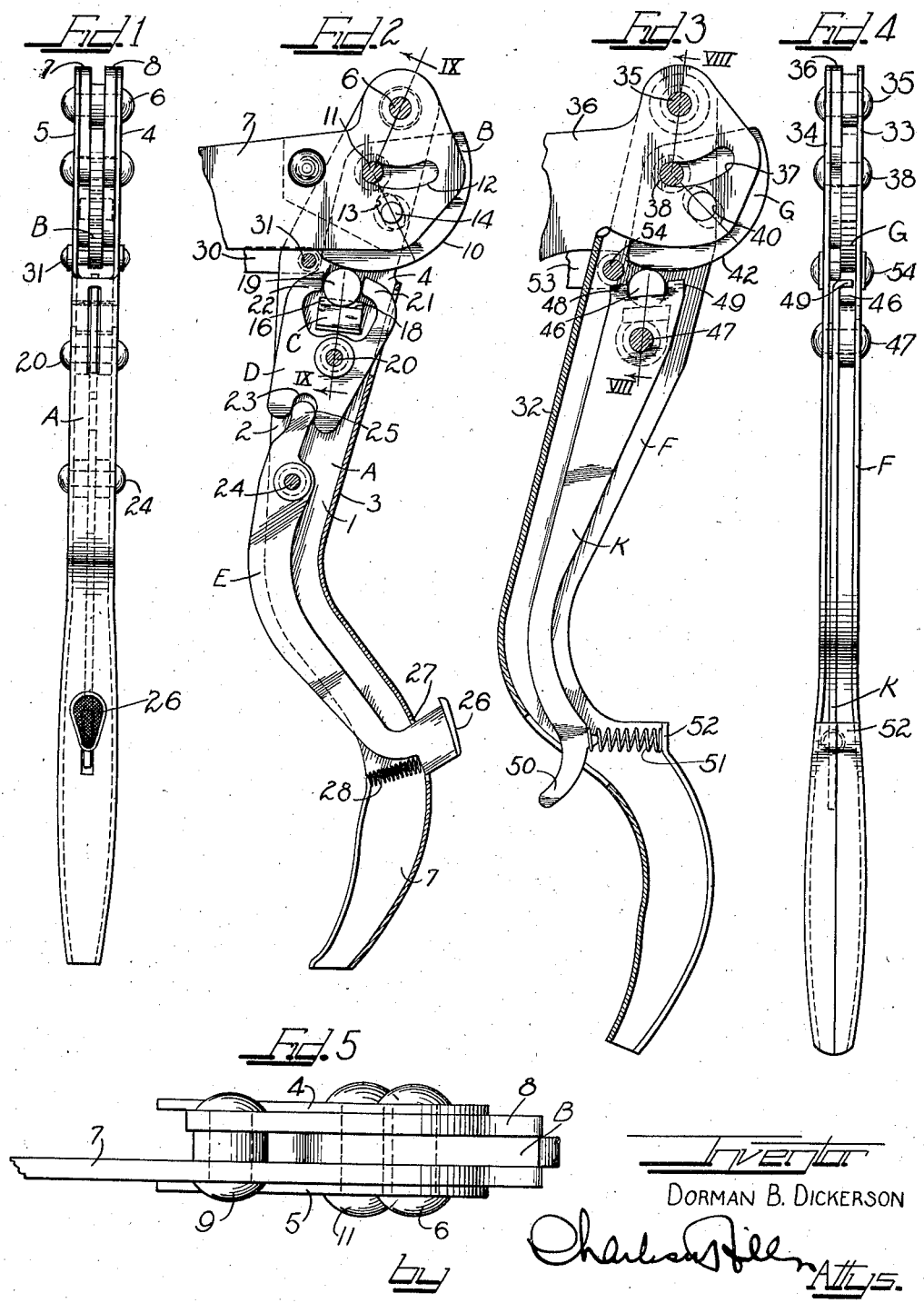

2,141,266

UNITED STATES PATENT OFFICE 2,141,266

BRAKE LEVER

Dorman B. Dickerson, Detroit, Mich., assignor, by mesne assignments, to Houdaille-Hershey Corporation, Detroit, Mich., a corporation of Michigan Application December 11, 1937, Serial No. 179,226

10 Claims. (Cl. 74—531)

The present invention relates to a brake lever and the like in which a friction device is utilized to hold the lever in adjusted position, in lieu of the usual pawl and ratchet construction.

The present invention relates to a brake lever construction wherein two relatively movable clutching surfaces are carried by the lever shaft, with a jamming member working between them, and in which the movement of one of the clutching surfaces assists in the movement of said jamming member into and out of holding relation with said clutching surfaces.

An object of the present invention is to provide a brake lever construction with novel means for locking and releasing the lever from adjusted position.

Another object of the present invention is to provide an emergency brake lever for automotive vehicles embodying novel friction clutch mechanism for holding the lever in any position of adjustment within its limits of swing and whereby the lever may be quickly and positively held when moved to brake applying position, and quickly and easily released with very little effort.

A further object of the present invention is to provide an emergency brake lever construction for automotive vehicles wherein two relatively movable members providing clutching surfaces are carried by the lever shaft, and with a jamming member working between them, and in which the movement of one of the clutching surfaces assists in the movement of the jamming member into and out of holding relation with said surfaces.

A still further object of the present invention is to provide friction brake lever construction for automotive vehicles, wherein a lever will be quickly and positively held in any position to which it is moved, and in which a so-called floating sector, pivotally mounted on a lever shaft and arranged for angular swinging movement counter to the direction of swing of the lever shaft is utilized as one of the clutching surfaces of the lever.

The invention has for an additional object the formation of an automotive emergency brake lever wherein the major parts are, in the main, formed as stampings of sheet material, thereby substantially reducing the cost of manufacture and assembly and enabling production of the parts on a commercial basis.

The above, other and further objects of the present invention will be apparent from the following description and accompanying drawings.

The accompanying drawings illustrate embodiments of the present invention, and the views thereof are as follows:

Figure 1 is a front elevational view of one form of the lever, showing the parts in "off" position.

Figure 2 is a view, partially in longitudinal central section and partially in elevation, of the lever of Figure 1, showing details of construction illustrating the position of the parts when the lever is in "off" position.

Figure 3 is a view similar to Figure 2, showing another form of the invention.

Figure 4 is a front elevational view of the lever of Figure 3.

Figure 5 is an enlarged fragmental top plan view of the lever of Figures 1 and 2.

Figure 6 is a fragmental front elevational view of a lever, substantially embodying the features of the lever of Figures 1 and 2, but illustrating a modified spring arrangement.

Figure 7 is a fragmental view, partially in longitudinal central section and partially in plan, of the lever of Figure 6, showing the modified spring construction.

Figure 8 is an enlarged sectional view taken in the plane indicated by the broken line VIII—VIII of Figure 3.

Figure 9 is an enlarged sectional view taken substantially in the plane of the broken line IX—IX of Figure 2.

Figure 10 is a fragmental view of the pivot end of the lever of Figure 3, showing the arrangement of the parts in full lines when in "off" position, and in dotted lines when in "on" position.

The drawings will now be explained.

Referring to Figures 1 and 2, a lever shaft A is formed as a stamping from flat metal, and as illustrated includes a shank portion 1 which is generally of U-shape in cross section, providing side walls 2 and a web 3. The side walls 2 are extended in what is herein shown as the upper end of the shaft, to provide a fulcrum area consisting of spaced parallel legs 4 and 5, which are suitably apertured to receive a pivot pin 6 for pivotally securing the lever shaft to a support. The opposite end of the shank is formed with a grip portion 7, shown as offset with respect to the fulcrum portion.

The levers herein illustrated are adapted as levers of the so-called "dash type", that is, levers which are pivoted behind the instrument boards of automotive vehicles with the grip portions projecting below the instrument boards so shaped and related that when the levers are moved to brake-setting or "on" position, the handle portions thereof will clear the adjacent margins of the door openings to thus be out of the way of the drivers entering or leaving the vehicles.

The support illustrated in Figs. 1, 2 and 5 consists of a bracket plate 7 suitably provided with openings, not shown, for the reception of rivets or bolts to secure the bracket in place behind the instrument board of an automotive vehicle. The bracket 7 is provided with a plate 8 secured to it, as by a rivet 9, and laterally spaced from the adjacent face of the bracket 7, to receive therebetween what is herein termed a floating sector B. The legs 4 and 5 of the lever shift A are pivoted through the plates 7 and 8 by the pivot pin or rivet 6, thus providing a fulcrum for the lever shaft.

The floating sector B is made as a stamping and has an arcuate edge 10 constituting its clutching surface. The sector is pivoted to the legs 4 and 5 of the lever shaft, by a suitable pivot pin 11 which passes through arcuate slots 12 formed in the bracket plates 7 and 8, as may be observed in Figures 6 and 9. The floating sector B is provided with an elongated slot 13, shown in dotted lines in Figure 2, within which works a pin 14 arranged with its ends in apertures 15 in the plates 7 and 8 of the support. This pin 14 serves as a center about which the floating sector B rocks to swing about its axis 11 as a center, as the lever shaft A is swung in service. The construction is such that as the lever shaft A is swung to and fro on its pivot 6, the floating sector B swings on its pivot 11, but in counter-angular direction.

The side walls 2 of the shank portion 1 are apertured as at 16 (see Fig. 9), to receive a block C. The block C, as may be observed in Fig. 9, is in length equal to the width of the lever shaft A, and in thickness is less than the height of the opening 16, so that the block may be applied to and removed from these openings or apertures. To hold the block C in position, the lower face thereof is offset at 17 to engage the inner faces of the side walls 2 of the shank immediately adjacent the aperture 16. The exposed face 18 of the block C constitutes a clutching surface in opposition to the clutching surface 10 of the floating sector B. The clutching surfaces 10 and 18 are spaced to receive between them a jamming member herein illustrated as a roller 19.

As may be observed from Fig. 2, the clutching surface 18 of the block C is employed in such manner as to afford a space between it and the clutching surface 10 of the floating sector which at some point is less than the diameter of the roller 19, so that the roller 19 may become jammed between these clutching surfaces to hold the lever in adjusted position. The roller 19 is restrained against endwise movement, that is, axial movement, by reason of the fact that its end surfaces are closely adjacent the inner surfaces of the walls of the shank at this portion of the lever shaft.

For maintaining the roller 19 in operative relation with respect to the clutching surfaces 18 and 10, a rockable member D, herein merely for convenience termed a "pawl", is pivoted at 20 to the walls 2 of the shank of the lever shaft A. The pawl D is provided with two upwardly extending fingers 21 and 22 with their ends inturned to engage opposite portions of the roller 19, as may be observed in Fig. 2. The extremities of the inturned ends are closely adjacent the roller, but spaced therefrom a very slight distance, to enable a slight movement of the roller between the ends of the fingers as it may be urged into or out of jamming relation with the clutch surfaces, as will be more fully explained. The pawl D is provided in its lower margin with a notch 23.

A release member E, consisting of a stamping, is pivoted at 24 to the side walls 2 of the shank of the lever member and is formed with one end extremity 25 centered in the notch 23 of the pawl D. The length of the release member E conforms generally to the contour of the lever shaft A, and at its lower end has a portion 26 working through an aperture 27 in the web of the lever shaft adjacent the grip portion 7, serving as a thumb button for actuation of the release member. As may be observed from Fig. 2, the pivot 24 of the release member is nearer the end of the release member which is in engagement with the pawl D. In order to maintain the thumb portion 26 of the release member projected, and to normally maintain the pawl D in the position shown in Fig. 2, a spring 28 is interposed between the thumb portion 26 of the release member and a suitable part of the lever member, such as the grip portion 7, as shown in Fig. 2.

An optional construction of the spring arrangement is that shown in Fig. 7, wherein a spring 29 is interposed between the web 3 of the shank and the end 25 of the release member closely adjacent the pawl D.

The construction of the clutching surfaces 10 and 18, the position of the roller 19, and that of the pawl D is such that under normal conditions, that is, when no thumb pressure is applied to the release member E, the roller is in surface engagement with the clutching surface 10 of the floating sector B and the clutching surface 18 of the block C.

The lever of Figs. 1 and 2 is connected to the brake rigging of the automotive vehicle by means of a yoke 30 pivoted at 31 to the lever shaft A in substantially the position illustrated in Fig. 2. The operation of the lever of Figs. 1 and 2 is as follows:

With the lever in the position shown in Fig. 2, which is the "off" position, the operator grasps the grip portion 7 of the lever shaft and swings the shaft in counter-clockwise direction. Because of the manner of operation of the floating sector B above described, this sector swings on the shaft in clockwise direction. Such clockwise swinging movement of the sector B urges the roller 19 to the left, as viewed in Fig. 2, that is, out of holding or frictional engagement with the clutching surfaces 10 and 18. The floating sector B continues to swing about its pivot 11 during the time the lever shaft A is being swung to brake-applying position. When the shaft is swung to such position as will set the brakes, the operator releases his hold on the grip portion of the shaft, whereupon the pull of the brake rigging imposed on the lever shaft A by the pull applied to the shaft through the yoke 30 tends to move the shaft in retrograde direction. Such tendency to move immediately swings the floating sector B in counter-clockwise direction, which movement urges the roller into frictional holding relation with the clutching surfaces 10 and 18, thus securing the lever in its then adjusted position.

It has been demonstrated that the drift-back or creep of the lever shaft due to the pull of the brake rigging when the shaft has been moved to brake-setting position is approximately one-half of the drift-back or creep of a lever of the pawl and ratchet type. That is to say, the arrangement of the roller and clutching surfaces of the present invention effects an almost immediate biting or holding relation of the roller with the clutching surfaces, thus assuring quick setting of the brakes.

The arrangement of the floating sector B between the plates 7 and 8 affords surface support for the sector, thus assuring that its clutching surface 10 is at all times in surface engagement with the roller 19.

In the form of lever shown in Figures 3, 4 and 8, the lever shaft F is formed as a stamping with parallel side walls and a web 32 affording a substantially channel-shaped or U-shaped cross-sectional construction. The fulcrum end of the shaft F is provided with spaced parallel legs 33 and 34 which are apertured to receive a pivot pin 35. In this construction, a supporting plate or bracket 36, formed as a stamping with its attaching end not shown, is adapted for securement in proper position behind the instrument board of the vehicle. The plate 36 is provided with an arcuate slot 37. A floating sector G is pivoted at 38 to the legs 33 and 34 of the shaft F, which pivot then projects through the slot 37 in the bracket 36. The floating sector G is pivoted against one side surface of the bracket 36, as may be observed in Fig. 8. The floating sector G is provided with a slot 39, into which extends a pin 40 headed at 41 in the bracket 36, which rocks the sector, causing it to swing about its axis 38 as a center as the lever shaft is swung in use. The floating sector G is provided with an arcuate clutching surface 42.

One of the walls of the shaft F, of which the leg 33 forms a continuation, is apertured at 43 to receive an angled end 44 of a block H having a clutching surface 45 in opposition to the clutching surface 42 of the floating sector G. A roller 46 is disposed between the clutching surfaces 42 and 45 for frictionally engaging these surfaces to hold the lever shaft F in adjusted position.

A release member K, formed as a stamping from flat stock, is pivoted at 47 to the side walls of the lever shaft F adjacent the fulcrum end of the base, and is formed at the roller end with inturned fingers 48 and 49 which straddle the roller 46 and serve to prevent displacement of the same from between the clutching surfaces. The lower end of the release member is formed with a trigger 50 which projects through the web of the shaft F adjacent the grip portion of the shaft in position to be engaged by a finger of the operator when he desires to release the lever. The trigger 50 of the release member K is normally maintained in outward position by means of a spring 51 acting against this end of the release member and supported by a shoulder 52 formed in the lever shaft F adjacent the grip portion of the same, as may be readily observed in Fig. 3. In this form of the lever construction, the brake rigging is connected to the lever shaft by means of a yoke 53 pivoted at 54 to the shaft, closely adjacent the fulcrum end of the lever shaft.

In the operation of this form of the invention, the operator grasps the grip portion of the shaft and swings it in counter-clockwise direction to apply the brakes. Such movement of the lever causes the floating sector G to swing in clockwise direction, thereby moving the roller 46 out of holding engagement with the clutching surfaces 42 and 45. When the lever has been moved to brake-setting position, the operator releases his hold on the grip portion of the lever, whereupon the pull imposed on the lever shaft F, incidental to the load of the brake rigging, tends to move the shaft in retrograde or clockwise direction. This tendency to so move causes the swinging sector G to move in counter-clockwise direction, which thereupon urges the roller 46 into frictional holding engagement with the clutching surfaces 42 and 45, thereby securing the shaft in holding position.

In this form of the invention, the normal driftback or creep of the cables due to the wedging action of the roller against the clutching surfaces 10 is approximately one-half of that experienced by the normal drift-back or creep of the cable attached to a brake lever construction of the pawl and ratchet type.

In Figure 10, the dotted position of the lever shows it at its maximum limit of travel in brakeapplying direction and shows the roller tightly wedged between the clutching surfaces of the block and the floating sector. It is usual, in the dash type of lever, to limit the movement of the lever shaft to approximately 45 degrees, as this amplitude of swing is all that is available in such dash-type levers.

It will be observed that the friction lever construction of the present invention is of such character that any tendency to move in retrograde movement stressed or imposed on the lever shaft by the pull of the brake rigging tends to swing the floating sector in a direction to urge the roller into tighter frictional engagement between the clutching surfaces, thus assuring positive holding engagement of the lever shaft and preventing accidental release which might otherwise be occasioned by the pull of the brake rigging.

It will also be observed that the lever construction of the present invention provides a lever shaft which carries two clutching surfaces, relatively movable, and which also carries the friction roller engageable between such clutching surfaces to hold the lever shaft in adjusted position.

The friction roller, in both forms of the lever construction illustrated and described, is retained against endwise movement by the side walls of the lever shaft, retained against vertical movement by the clutching surfaces, and laterally by the fingers of the release mechanism, thus being free to be forced into wedging engagement with the clutching surfaces as the floating sector is moved or tends to move in such direction as to cause the roller to ride up the incline of the wedging surface of the block. The clutching surfaces of the floating sectors are formed as true arcs.

The blocks C and H have their clutching surfaces hardened to prolong the life of the blocks and to prevent any indentations being formed by reason of the pressure applied when the rollers are urged into frictional holding engagement with the clutching surfaces of the sectors.

The lever shaft, the supporting bracket, the floating sector, release member, all are formed as stampings from flat material, thus reducing the cost of construction of these brake levers. The blocks, being loosely supported in the levers, may be replaced, if damaged to an extent as to be no longer useful.

In the form of the lever shown in Fig. 3, the block is secured in place by the pivot 47 which connects the release member K to the lever shaft F. This block, to be removed, would require removal of the pivot 47, which could be easily accomplished.

The present invention incorporates clutching means for holding the lever shaft and associated mechanism in any desired position of adjustment.

The formation of the fixed clutching surfaces as blocks with flattened surfaces reduces the cost of manufacture of these parts, and the inclined manner of mounting the blocks secures all the advantages that might be present in costlier blocks having curved clutching surfaces.

The manner of swinging the floating sector is such as to cause the sector to swing at a higher rate of angular speed than the lever shaft, thus accelerating movement of the roller into and out of clutching relationship with respect to the clutching surfaces, depending on the direction of swing of the lever shaft.

An advantage of the present invention resides in the fact that the clutching surfaces, roller, release mechanism may all be assembled on the lever shaft prior to its application to its supporting bracket, thus making the assembly of the lever a simple one, as all there has to be done is to apply the lever shaft to the supporting bracket and insert its pivot, that is, the pivot 6 of Fig. 2 or the pivot 35 of Fig. 3.

While the lever shafts are shown as pivoted to their supports by rivets, in practice these lever shafts are pivoted to their supports by bolts, thus expediting assembly and enabling ready removal in the event it becomes necessary to repair or replace any of the operating parts. The levers of the present invention form friction type levers which are economical to manufacture, and which are positive in operation and respond quickly to actuation thereof by the vehicle operators.

It is also well-known practice to rivet the lever shaft to the brackets and the pivotal connections prior to the application of the brackets to the vehicle. Thus, whenever it is necessary to repair any portion of the brake lever, the bracket must be removed, which is a simple operation, as the bracket is held in place by bolts.

The arrangement of the parts affords ample clearance for the rollers to allow for any slight inaccuracies that may occur in the manufacture of any of the parts of the lever. Clearance is also desirable in order that the roller may have limited movement to accommodate itself to swing of the floating sectors and also to accommodate itself to the wedging engagement between the friction or clutching surfaces. This amount of clearance, however, need be slight, as the roller is positively urged into or out of holding engagement with the clutching surfaces by swinging movement of the floating sectors.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. An emergency brake lever construction for automotive vehicles including a support, a lever shaft pivoted to said support to swing, clutching means carried by said lever shaft and including two relatively movable clutching surfaces and an interposed roller, and means for moving one of said clutching surfaces with respect to the other as the shaft is swung in brake-applying direction to move said roller away from holding engagement with the clutching surfaces and operative to move the roller into jamming engagement with the clutching surfaces when the lever shaft tends to retrograde movement due to pull of the connected brake mechanism.

2. An emergency brake lever construction for automotive vehicles including a support, a lever shaft pivoted to said support to swing, a sector pivoted to said lever to swing and having a curved edge constituting a clutching surface, another member carried by said lever shaft and having a flat face constituting a clutching surface disposed adjacent the curved edge of said sector, a roller carried by said lever shaft and working between said clutching surfaces, a rockable member pivoted to said lever shaft and having fingers to straddle said roller, spring means operative to cause said rockable member to normally maintain said roller in clutching engagement with said clutching surfaces, and means operative to swing said sector in direction counter to the direction of swing of the lever, the construction being such that as the lever is swung in brake-applying direction the sector is swung in counter-direction to urge the roller away from clutching engagement with the clutching surfaces and when the lever tends to retrograde movement due to pull of the connected brake mechanism said sector tends to swing in the opposite direction and urge the roller into holding engagement with said clutching surfaces.

3. An emergency brake lever construction for automotive vehicles including a support, a lever member pivoted to said support, a floating sector pivoted to said lever member to swing and having a clutching surface concentric with its axis, a connection between said support and said sector for swinging the latter on its pivot as the lever member is swung, an abutment on said lever member having a flat face and constituting another clutching surface in opposition to the clutching surface of said sector, a roller loosely supported by said lever member between said clutching surfaces, a member oscillatable on said lever member and engageable with opposite portions of the roller and tending normally to maintain said roller in contact with said clutching surfaces, and a manipulating member pivoted to said lever member and operable to actuate said oscillatable member in a direction to move the roller out of contact with one of said clutching surfaces to permit movement of the lever member in a direction to release the brakes.

4. In a device of the class described, a support, a swingable lever shaft pivoted to said support, movable and fixed confronting clutching surfaces carried by said lever shaft and spaced from each other, a movable jamming member disposed between said clutching surfaces and carried by said lever shaft, means maintaining said member in such position with respect to the clutching surfaces as to subject it to movement of the movable clutching surface for movement of the member into and out of jamming relation with respect to said clutching surfaces, and a connection between said support and said movable clutching surface to cause the latter to move the jamming member out of clutching engagement with the clutching surfaces as the lever shaft is moved to apply the brakes and to urge the jamming member into holding engagement with the clutching surfaces when the lever shaft tends to retrograde movement due to pull of the connected brake mechanism.

5. A device as claimed in claim 1, in which one of the relatively movable clutching surfaces is in the form of a sector pivoted to the lever and swingable relatively to the lever.

6. A device as specified in claim 1, in which one of the clutching surfaces is in the form of a sector pivoted to the lever and swingable relatively to the lever in angular direction counter to the direction of lever swing.

7. A device as specified in claim 1, in combination with a rockable member pivoted to the lever shaft and having fingers astraddle the roller, a release member operatively associated with said rocking member to rock it to displace the roller from holding engagement with the clutching surfaces, and a spring tending normally to maintain said rocking member in such position as to retain the roller in clutching engagement with said clutching surfaces.

8. An emergency brake lever construction for automotive vehicles including, in combination, a support, a lever pivoted to said support, means carried by said lever and comprising two spaced clutching surfaces and an intervening roller carried by said lever member adapted to be jammed between said surfaces to hold said lever in adjusted position, and means pivoted to said lever and operable to shift said roller out of jamming engagement with said surfaces to enable release of the brakes.

9. An emergency brake lever construction for automotive vehicles including a support, a lever member pivoted to said support to swing, a sector pivoted to said lever member to swing with respect to said lever member, a connection between said support and said sector to cause said sector to swing in counter-direction to the direction of swing of the lever, an abutment on said lever presenting a flat clutching surface, a roller carried by said lever and interposed between said sector and said flat clutching surface, means pivoted to said lever and providing fingers straddling said roller, spring means acting against said last-mentioned means to normally maintain said roller in clutching engagement with flat clutching surface and said sector, and means operable by digital pressure to actuate said last mentioned means to displace said roller from clutching engagement between said sector and said clutching surface, the construction being such that as said lever tends to move in retrograde movement due to pull of the connected brake mechanism said sector is caused to swing in a direction to urge the roller into tight friction engagement between said sector and said flat clutching surface.

10. An emergency brake lever construction for automotive vehicles including in combination, a support, a lever pivoted to said support, means carried by said lever and comprising two spaced clutching surfaces and an intervening roller carried by said lever member adapted to be jammed between said surfaces to hold said lever in adjusted position, means pivoted to said lever and operable to shift said roller out of jamming engagement with said surfaces to enable release of the brakes, and a trigger arranged for forefinger manipulation to actuate said last mentioned means.

DORMAN B. DICKERSON.